United States Patent [19]

Andersson

[11] Patent Number: 4,539,073
[45] Date of Patent: Sep. 3, 1985

[54] METHOD AND APPARATUS FOR MEASURING THE SIZE OF A DISCHARGE SLOT IN A HEADBOX

[75] Inventor: Anders I. Andersson, Hammarö, Sweden

[73] Assignee: KMW Aktiebolag, Karlstads, Sweden

[21] Appl. No.: 426,104

[22] Filed: Sep. 28, 1982

[30] Foreign Application Priority Data

Dec. 1, 1981 [SE] Sweden .............................. 8107155

[51] Int. Cl.³ .................................................. D21F 1/02
[52] U.S. Cl. ..................................... 162/198; 162/259; 162/262; 162/263; 162/347; 367/96
[58] Field of Search ............... 162/252, 253, 259, 347, 162/263, 49, 198, 192, 343, 262; 367/96, 902

[56] References Cited

U.S. PATENT DOCUMENTS

| | | | |
|---|---|---|---|
| 3,225,988 | 12/1965 | Drenning | 367/96 |
| 3,341,400 | 9/1967 | Grater . | |
| 3,442,756 | 5/1969 | Lehtinen | 162/192 |
| 3,468,756 | 9/1969 | Villa | 162/344 |
| 3,487,686 | 1/1970 | Salomon . | |
| 3,598,696 | 8/1971 | Beck . | |
| 3,839,143 | 10/1974 | Suckow . | |
| 3,923,593 | 12/1975 | Verseput . | |
| 3,947,317 | 3/1976 | Stotz et al. . | |
| 3,994,773 | 11/1976 | Wolf et al. | 162/198 |
| 4,021,295 | 5/1977 | Schmaeng . | |
| 4,086,130 | 4/1978 | Justus . | |
| 4,210,969 | 7/1980 | Massa | 367/902 |

FOREIGN PATENT DOCUMENTS 1488200 10/1977 United Kingdom .

OTHER PUBLICATIONS

Pages 14-15 of "Valmet News", (vol. 8, No. 3/1981), Antti Lehtinen of Rautpohja, author.
Pages 673-675 of "Measurement of the Thickness of Fiber Suspension on the Fourdrinier Wire with Ultrasonics", (vol. 47:11, 1965), Popper och Tra, author.

*Primary Examiner*—Steve Alvo
*Attorney, Agent, or Firm*—Bell, Seltzer, Park & Gibson

[57] ABSTRACT

A method and apparatus for obtaining information, during operation of a headbox for a paper machine, about the size, at one measuring point at least, of a stock discharge slot which is bounded by two structural members comprising two lip members of the headbox of two partitions arranged between the lip members or one of said lip members and one of said partitions. According to the invention, for every such desired information, an ultrasonic transducer means arranged at the measuring point in the headbox and with a combined transmitter and receiver for ultrasound is arranged to transmit an ultrasonic pulse through the stock between two of said structural members within predetermined surface areas of these located in proximity to said discharge slot. By means of an electronic measuring unit connected to the ultrasonic transducer means, the travel time of ultrasonic pulse from transmitter to receiver is measured and, knowing the sound velocity through the stock at the temperature in question, the size of the discharge slot can be established.

22 Claims, 11 Drawing Figures

METHOD AND APPARATUS FOR MEASURING THE SIZE OF A DISCHARGE SLOT IN A HEADBOX

FIELD AND BACKGROUND OF THE INVENTION

The present invention relates to a method and an apparatus for obtaining information during the operation of a headbox or similar stock-discharging means for a paper machine about the size of a stock discharge slot.

Headboxes are included in the wet end of a paper machine and are used to distribute the stock evenly across the width of the wire and to control the discharge so that this takes place at a uniform velocity and in the same direction across the entire width of the wire. With increasingly higher paper machine speeds, there has been a changeover to closed headboxes which operate under pressure. This has also made it possible to limit the size of the headboxes. While the industry has demanded higher production rates for the paper machines, it also requires that the same high quality standards of the paper be maintained. For special headboxes for two or more stock jets, i.e. so-called multilayer headboxes, the higher production speeds involve major problems in producing a paper web of satisfactory quality with regard to desired uniformity of basis weight and thickness of the combined layers. It is therefore of great importance that the slice opening and the heights of the channels, i.e., the distances between two channel-forming surfaces, be kept constant and under close control so that the discharged stock jets will be uniform with respect to velocity and thickness and so that, as a result, optimum dry weight profiles and/or moisture profiles of the paper web will be obtained. Multilayer headboxes of this type are disclosed for example in U.S. Pat. No. 3,598,696 (Beck); U.S. Pat. No. 3,839,143 (Suckow); U.S. Pat. No. 3,923,593 (Verseput); U.S. Pat. No. 4,021,295 (Schmaeng); and U.S. Pat. No. 4,086,130 (Justus). Headboxes for a single layer web are disclosed, for example, in GB No. 1,488,200 and U.S. Pat. No. 3,994,773 (Wolf et al).

For controlling the velocity of the stock jet emerging from a headbox, it has been heretofore proposed in U.S. Pat. No. 3,487,686 (Salomon) to measure the velocity of the jet emerging from a headbox by generating pressure waves in the jet which are caused to strike two probes arranged at a distance from each other. U.S. Pat. No. 3,341,400 (Grater) discloses a pressure headbox that can be equipped with a piezoelectric crystal for sensing changes in the pressure of the stock flowing through a passage.

According to the methods previously employed for measuring the size of a stock discharge opening, either the movements are measured of an actuator operating a lip member or slice, so that by means of calculation and with a knowledge of the jack rises and lever lengths, the changes in position of a lip member of the headbox can be determined (as in Stotz et al U.S. Pat. No. 3,947,317), or some type of transducer is used to measure the position of the pivoted lip member in relation to some form of reference (as in the aforementioned Wolf et al U.S. Pat. No. 3,994,773). The first method, which is the one most often employed, has the drawback that play in the pivots and deflections of both lip members will not be taken into account. Similarly, the second method fails to record the deflections of the non-pivoted lip member, and thus these vital changes will not be controlled.

In GB No. 1,488,200 a headbox is disclosed that is provided with profile adjusting means comprising a plurality of slice screws and a slice strip deformable by the slice screws and which is secured at its ends to an upper lip and forms a slice aperture together with a lower lip. The slice screws can be provided with e.g. dial indicators of micrometer type or differential transformers in order to measure changes in the slice opening profile. What this and other known systems of slice opening profile adjustment have in common is that the measurements are based on a reference means instead of measuring the distance to an opposed lip member. At present great efforts are being made to produce reliable control systems that are based on the transmission of information from the lip members and the paper web to a computer for more rational and correct decisions concerning necessary adjustments of the slice opening profile.

No method of measuring directly the actual distance between the slice lips and/or partitions continuously during operation, for checking these distances or the slice opening profile, has been suggested previously, despite the fact that there has long been a need for this. Said deflections of the lip members are usually of considerable magnitude, particularly in modern high speed machines with internal pressures in the headbox of up to 5 bar, which on the large areas exposed to this pressure will produce forces acting to separate the lip members in the order of 500,000 N/meter width of the headbox. The value of the deflection of the lip member is usually 2 mm, which should be compared with the slice openings that are normal, 7–12 mm, in other words a considerable deviation.

The need to obtain accurate control of the most vital parts of the headbox is also accentuated in that papermaking now takes place to a large extent under computer-based control and that the need for further computerization, as complete as possible, and thereby the possibility of refined control methods of papermaking has assumed a prominent position in profitability analyses.

SUMMARY OF THE INVENTION

With the foregoing in mind, it is an object of the present invention to provide a method and apparatus of determining distance in a headbox for a paper machine in order to rapidly procure technical particulars about the actual distance conditions and, on the basis of these, to put into effect immediate mechanical adjustments, changes in the process or control measures to attain desired values in the paper web.

Pursuant to the method according to the present invention, information about the size of a stock discharge slot of a paper machine, which is defined between two structural members positioned in opposing spaced apart relation to one another, is obtained continuously during the operation of the paper machine by transmitting an ultrasonic pulse from one of the structural members through the stock passing between the cooperating structural members and to the oppositely positioned structural member, and measuring the travel time of the ultrasonic pulse across the slot, from which can be determined the size of the stock discharge slot.

An apparatus in accordance with the present invention comprises stock-delivering means including a pair of cooperating structural members positioned in opposing spaced apart relation and defining a stock discharge slot therebetween, with ultrasonic transducer means mounted in one of the structural members and arranged to transmit an ultrasonic pulse through the stock passing between the cooperating structural members and to the oppositely positioned structural member, and an electronic measuring unit is connected to the ultrasonic transducer means and is operable to measure the travel time of the ultrasonic pulse across the slot defined between the two structural members.

The two structural members which define the stock discharge slot may take several different forms. For example, the stock-delivering means may comprise a conventional single layer headbox, and the pair of cooperating structural members which define the slot comprise two lip members of the headbox. The invention is also applicable to a headbox of the multilayer type, adapted for producing multilayer webs, and which include at least one separating partition located between the two lip members of the headbox. In this case, the two structural members referred to may be a lip member and a separating partition member, or two such partition members. The present invention is also applicable to a headbox of the type in which one lip member is positioned closely adjacent to a forming means, such as a forming roll, for forming the stock discharge slot therebetween. In this instance, the two structural members referred to above comprise the lip member of the headbox and the cooperating oppositely positioned forming means.

In accordance with one aspect of the invention, information about the profile of the discharge slot may be readily obtained by providing a plurality of ultrasonic transducer means arranged in one of the structural members at spaced locations across the width of the structural member for measuring the distance to the other, oppositely positioned structural member at a plurality of measuring points.

In accordance with a further feature of the invention, it is possible to compensate for variations in the sound velocity value with respect to the working temperature of the stock. This is accomplished by providing a reference ultrasonic transducer means operatively connected to the measuring unit and being operable for indirect measurement of the sound velocity in the stock at different temperatures by measuring the travel time of an ultrasonic pulse across a known distance in the stock at the working temperature in question. From this information, the measuring unit can adjust the measured travel time across the slot so as to indicate actual distance values for the discharge slot taking into account the sound velocity value at the working temperature of the slot.

BRIEF DESCRIPTION OF THE DRAWINGS

The invention is illustrated more fully below in conjunction with some embodiments that are described with reference to the drawings, where.

DETAILED DESCRIPTION OF ILLUSTRATED EMBODIMENTS

Figure 1:
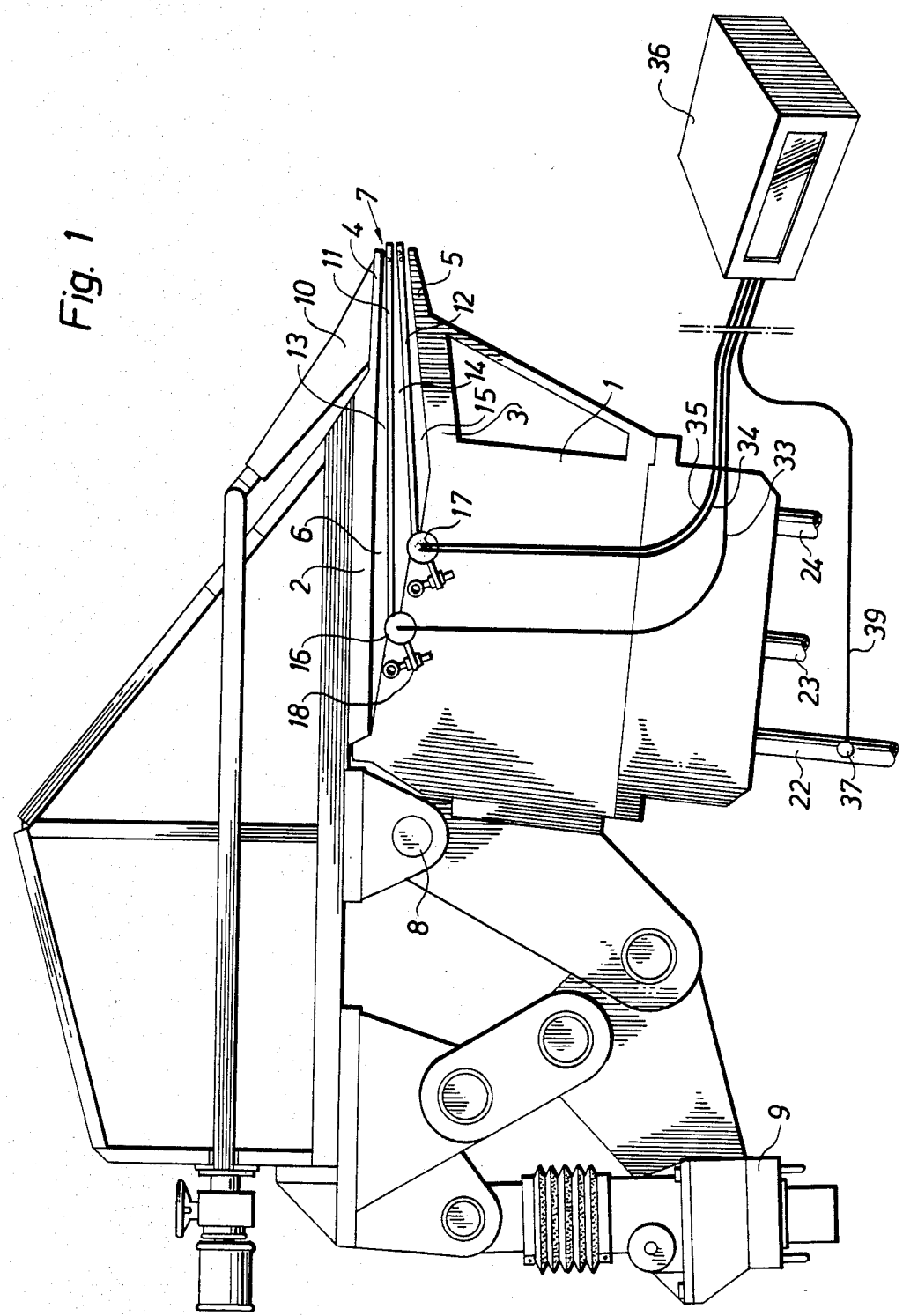
FIG. 1 is a schematic side view of a headbox for a paper machine, provided with an apparatus according to a preferred embodiment of the invention.

Referring to FIG. 1, there is shown schematically a multilayer headbox 1 for use in a twin-wire former and comprising two walls 2, 3 arranged at a distance from each other with two structural members in the form of interacting lip members, which in this embodiment are arranged as an upper lip 4 and a lower lip 5. The two opposed walls 2, 3 demarcate a space 6 converging in the direction of flow and which, at the lips 4, 5, terminates in a stock discharge slot in the form of a slice opening 7. The converging space 6 is bounded laterally by side walls (not shown). The headbox is arranged in close connection to a web forming zone (not shown) of a paper machine for forming a paper web, the width of which is determined by the length of the slice opening 7 in a direction across the machine direction. One of the walls of the headbox, here the upper wall 2 as the shown headbox is located, is hinged and pivotable about a rear, horizontal pivot 8 for moving the upper lip 4 in relation to the lower lip 5 by a power transmission means 9 to thereby set the desired size of slice opening 7, i.e. the distance between the lips 4, 5. Further, the upper lip 4 is connected in a conventional way to a plurality of profile adjusting means 10 equally spaced in the cross direction of the headbox and which are included in separate power-actuated linkages for individual local adjustment of the slice opening.

The headbox also comprises structural members arranged in the space 6 in the form of two flat partitions 11, 12, which divide the space 6 into three portions 13, 14, 15 of stock channels converging in the direction of flow. Each partition is attached at its inner end to its own holder 16, 17, which are pivotally mounted in horizontal grooves in the rear portion of the headbox. By means of individual setting mechanisms 18, the holders can be turned and fixed in a desired setting of the partitions. This arrangement permits a presetting of the partition positions in relation to each other and in relation to the upper and lower lips 4, 5.

Figure 2:
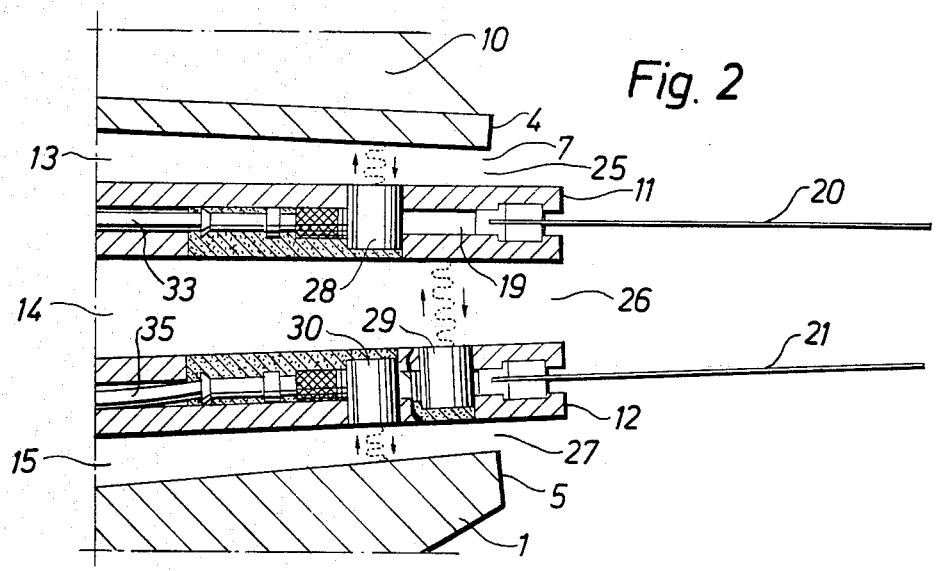
FIG. 2 shows a section through portions of lip members and partitions located between them in a headbox according to FIG. 1.
Figure 3:
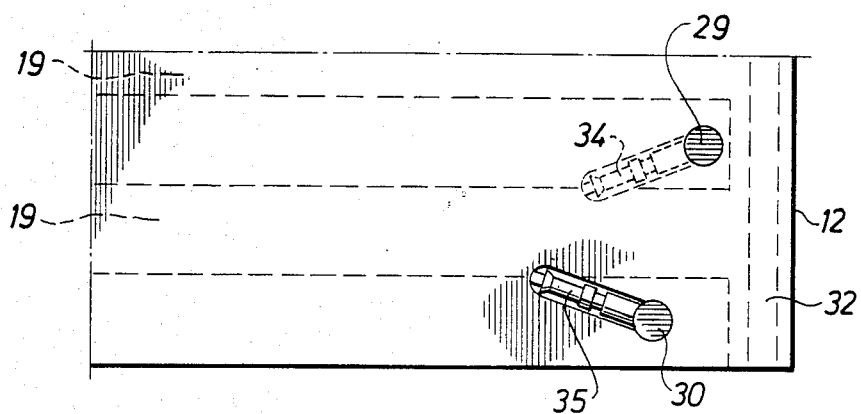
FIGS. 3 and 4 show corner portions of the partitions in FIG. 2 as seen from above.
Figure 4:
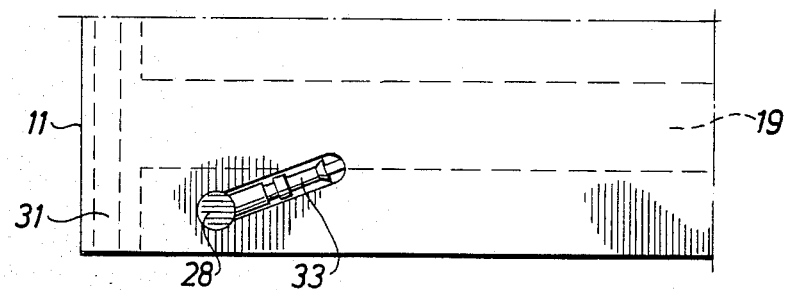

As shown in greater detail in FIG. 2, each partition 11, 12 is provided with air ducts 19, through which air is supplied and discharged at the front end of the partition for forming air wedges between the emerging stock layers. Further, a foil 20, 21 can project from each partition, this being arranged to reduce velocity components of the stock layers directed towards each other at the tip of the air wedge.

The headbox is provided with three inlets (not shown) at its rear end and each of these is in communication with one of the three converging channel portions 13, 14, 15. The inlets are each connected to a feed pipeline 22, 23, 24, which each contain a pump (not shown) driven by an electric motor, these pumps being connected to stock supplies (not shown). Alternatively, several pumps, e.g. those for the outer channels 13, 15 can be fed from the same stock supply. The speed of each motor can be sensed by a tachometer generator in a conventional way, the generator signal being fed back to a speed regulator unit that includes a thyristor and a speed regulator.

During operation, stock is fed by means of said pumps through the feed pipelines to the three separate channels of the headbox, through which the stock passes under high pressure and is discharged at the slice opening in three separate jets, which are dewatered beyond the foils 20, 21 on a forming means in the form of a wire or two wires or similar finely-perforated endless belts in the forming zone of the paper machine and therewith are consolidated into a multilayer fiber web.

By means of said partitions, the slice opening is divided up into three smaller stock discharge slots 25, 26, 27, the sizes of which are determined with the aid of ultrasound by arranging ultrasonic transducer means in the headbox in accordance with the present invention. For this purpose in the embodiments shown in FIGS. 1-4 an ultrasonic transducer 28 (see FIG. 2) is arranged in the upper partition 11 in order to provide information about the distance to the upper lip 4, while two ultrasonic transducers 29, 30 are arranged in the lower partition 12 in order to provide information about the distance to the upper partition 11 and the lower lip 5, respectively. The ultrasonic transducers are flush-mounted in the partitions as far forward as possible and in proximity to one of their side portions 31, 32 and have no projecting parts that could affect the flow detrimentally. Spaces adjoining the transducers are filled with suitable material, e.g. silicone rubber, in order to obtain smooth surfaces. The ultrasonic transducers are connected by means of coaxial cables 33, 34, 35 running in cavities in the partitions to a common electronic measuring unit 36 located outside the headbox and which records and processes the measurement results from the ultrasonic transducers. The ultrasonic transducers are located at equal distances from the narrow discharge slots 25, 26, 27. The natural frequency of the ultrasonic transducers can be e.g. about 1-6 MHz.

Every ultrasonic transducer is arranged within predetermined surface areas of the partitions and is also suitably of the kind that comprises a piezo-electric crystal, which acts as a transmitter and receiver for ultrasound. An ultrasonic pulse is transmitted through the flowing stocks after the crystal has been excited by a signal from the electronic measuring unit 36. The ultrasonic wave is reflected against an opposed surface within a predetermined surface area of this, which surface in the three cases consists of the flat insides of the lips 4, 5 and the flat underside of the upper partition 11, respectively, and on returning to the ultrasonic transducer then generates a signal which is sent to the measuring unit 36 for further processing, in that the time between the two signals represents the travel time of the ultrasonic wave and is thereby a measure of the two-way distance between the two surfaces. Knowing the sound velocity in the medium at the prevailing temperature, this measurement reading can then be converted to an actual distance value for the measuring point. As the channels are converging, the geometrical differences between the measuring point and the discharge slots 25, 26, 27 must be taken into account in order to obtain the distances that exist at these. This calibration can easily be done in the measuring unit with a knowledge of this geometry.

Figure 5:
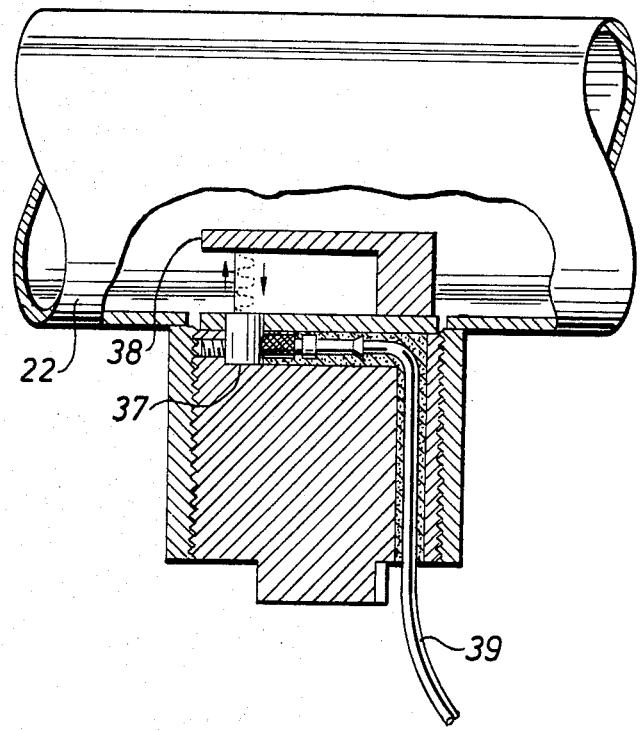
FIG. 5 shows a portion of a stock feed pipeline to the headbox according to FIG. 1, and a reference ultrasonic transducer means arranged therein.

Trials have proved that the velocity of sound varies with the temperature, but not at all or only negligibly with the fiber concentration in the stock. When operating at different temperatures, the sound velocity can be compensated to obtain the actual distance values at each temperature. This can take place directly guided by the prevailing temperature at an operation by making use of calibration curves that have been obtained at different temperatures, but with otherwise similar conditions in the stock. According to a second method, which is preferred, at least one additional ultrasonic transducer means of the kind described is used as a reference. Such a reference ultrasonic transducer means is fitted suitably in one of the feed pipelines in order to measure a distance well defined beforehand. A reference ultrasonic transducer means 37 is shown in FIG. 5 arranged in a feed pipeline 22 and which forms this distance between itself and a mounting 38 built into the pipeline. The reference ultrasonic transducer 37 is connected by a coaxial cable 39 to the electronic measuring unit 36. The reference ultrasonic transducer will be exposed to the same stock conditions as the ultrasonic transducers in the headbox and use can then be made of the knowledge as to which dimension the reference ultrasonic transducer must measure in order to obtain exactly the sound velocity in question. This direct calibration against the reference ultrasonic transducer is carried out continuously before each readout of the values of the discharge slots in order to ensure a correct measurement. The use of a plurality of ultrasonic transducers does not mean that the electronics need to be duplicated. A changeover between the reference ultrasonic transducer and the different ultrasonic transducers in the headbox can take place either automatically or manually. The measurement results can be read on a digital display in the measuring unit 36. When the sound velocity value from the reference ultrasonic transducer has been set on the measuring unit, so that this indicates said specific distance, all measurement results from the headbox shown on the measuring unit will agree with reality. The measuring unit is of the kind that automatically measures the channel distances in respective channel in a definite order. The measurement signal from each ultrasonic transducer is processed in the measuring unit, when the preset sound velocity value is taken into account. From the measuring unit outputs a signal is obtained which is proportional to the channel distance measured, in that each output comprises a holding circuit which holds the output signal value until a new measurement result is obtained.

Figure 6:
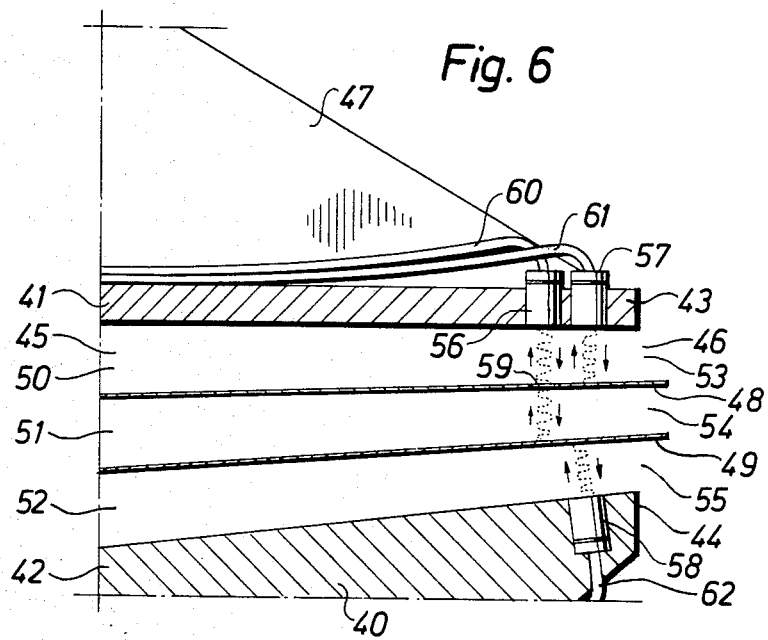
FIG. 6 shows in section portions of lip members of a headbox of a second design and provided with an apparatus according to a second embodiment of the invention.

The ultrasonic transducers can be mounted alternatively in the upper or lower lips in order to obtain information as to the distance to an adjacent partition. An arrangement like this is suitable for use in cases where the partition or partitions are so thin that mounting equipment in these is not practicable. Such an alternative embodiment is shown in FIG. 6. A multilayer headbox 40 comprises opposed walls 41, 42 with two structural members in the form of interacting lip members, which are arranged as an upper lip 43 and a lower lip 44, which walls demarcate between them a space 45 converging in the direction of flow that terminates at the lips in a stock discharge slot in the form of a slice opening 46. As for the headbox described previously, the upper lip 43 is pivotally mounted about a rear horizontal pivot (not shown) for setting the size of the slice opening and is connected to a plurality of profile adjustment means 47 equally spaced in the cross direction of the headbox for local adjustment of the slice opening profile. The headbox also includes in the space 45 structural members arranged in the form of two thin partition members 48, 49, which are attached at their inner ends inside the headbox and divide the space 45 into three portions 50, 51, 52 of stock channels converging in the direction of flow. By means of these thin partitions, the slice opening 46 is divided into three smaller stock discharge slots 53, 54, 55, the size of which is determined with the aid of ultrasound in accordance with the present invention. For this purpose, a first ultrasonic transducer means 56 and a second ultrasonic transducer means 57 are arranged in the upper lip 43, in that the upper thin partition is provided with a hole 59 in a predetermined surface area, which is located exactly opposite said first ultrasonic transducer. The first ultrasonic transducer measures the distance to the lower partition in that a transmitted and reflected ultrasonic pulse can pass through the hole 59 in the upper partition, while the second ultrasonic transducer measures the distance to the upper partition.

By subtracting the thickness of the upper partition 48 and the measurement result on the transducer 57 from the measurement result on the transducer 56, the actual distance between the two partitions can be obtained. Further, a third ultrasonic transducer means 58 is arranged in the lower lip 44 in order to measure the distance to the lower thin partition 49. In this application, however, it is most often impossible to take measurements at the outermost corners of the lip members and the thin partitions. The ultrasonic transducer can be located even in this case so that the distance to the edge of slot or opening is equal for all ultrasonic transducers (by locating the first ultrasonic transducer at the side of the other) and is as small as practicable, which will give measurement results proportional between themselves, at which regard is taken to the geometry in the slice opening area to calculate the actual distances at the slice opening downstream of the transducers, as stated previously. The ultrasonic transducers 56, 57, 59 are connected by means of coaxial cables 60, 61, 62 to an electronic measuring unit (not shown), which is also supplied with signals from a reference ultrasonic transducer (not shown), which is mounted in one of the feed pipelines to the headbox in order to take into consideration the actual sound velocity in the stock at the prevailing temperature, as described previously.

Figure 7:
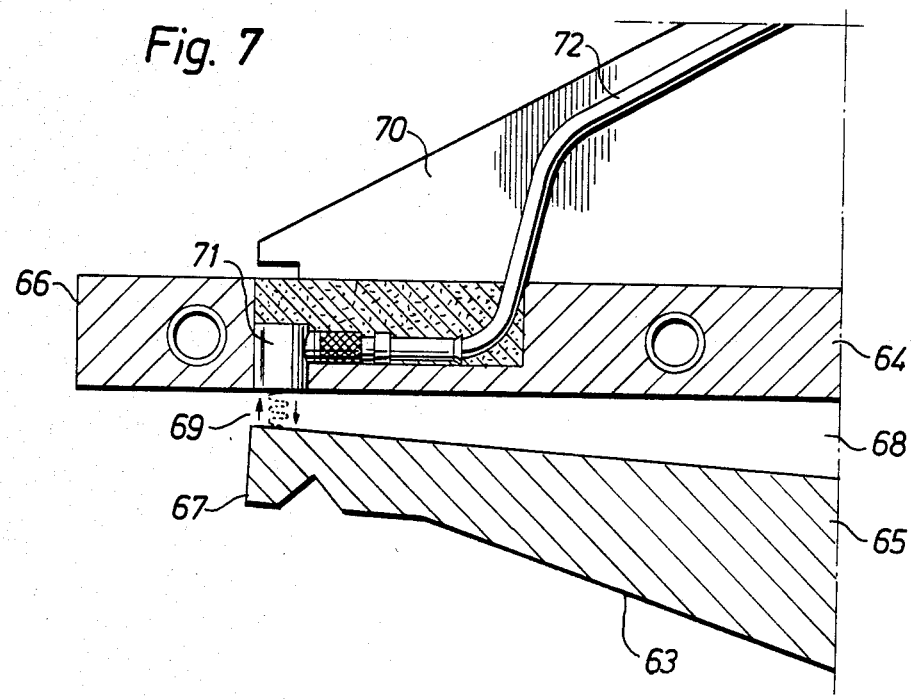
FIG. 7 shows in section portions of lip members of a headbox of a third design and provided with an apparatus according to a third embodiment of the invention.

FIG. 7 shows a headbox 63 for producing a single-layer fiber web. The headbox comprises opposed walls 64, 65 with two structural members in the form of interacting lip members, which are arranged as an upper lip 66 and a lower lip 67, which walls demarcate between them a space 68 converging in the direction of flow and which terminates at the lips in a stock discharge slot in the form of a slice opening 69. As for the headbox described previously, the upper lip 66 is pivotally mounted about a rear horizontal axis (not shown) for adjustment of the size of the slice opening and is connected to a plurality of profile adjustment means 70 equally spaced in the cross direction of the headbox for local adjustment of the slice opening profile. An ultrasonic transducer means 71 is shown mounted in the upper lip near one of its corners and is arranged to provide information about the distance to the lower lip 67, according to the principle described previously. The ultrasonic transducer is arranged so near the edge of the opening that any correction for the geometry will not be necessary in this case. The ultrasonic transducer is connected by means of a coaxial cable 72 to an electronic measuring unit (not shown), which is also supplied with signals from a reference ultrasonic transducer (not shown), which is mounted in a feed pipeline to the headbox in order to take into regard the actual sound velocities in the stock at prevailing temperatures, as described previously.

Figure 8:
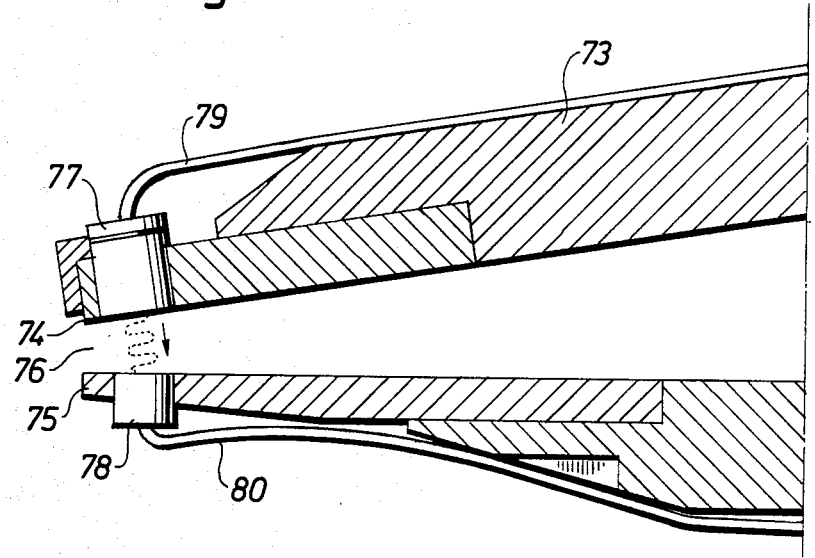
FIG. 8 shows in section portions of lip members of a headbox of a fourth design and provided with an apparatus according to a fourth embodiment of the invention.

FIG. 8 shows an alternative embodiment of the apparatus according to the invention, in which a headbox 73 for producing a single-layer fiber web is provided with two structural members in the form of interacting lip members, which are arranged as an upper lip 74 and a lower lip 75, as described earlier, in which the lips demarcate a stock discharge slot in the form of a slice opening 76. In this embodiment an ultrasonic transducer means is arranged with separate transmitting and receiving functions in that a first ultrasonic crystal 77 is flush mounted in the upper lip 74 to act as transmitter of an ultrasonic pulse and a second ultrasonic crystal 78 in the lower lip 75 exactly opposite the first ultrasonic crystal to act as receiver of the transmitted ultrasonic pulse. The ultrasonic pulse will travel a single distance, which means that an electronic measuring unit connected to the ultrasonic crystals by cables 79, 80 will not need to halve the measurement result, as is the case in the embodiments described previously.

Figure 9:
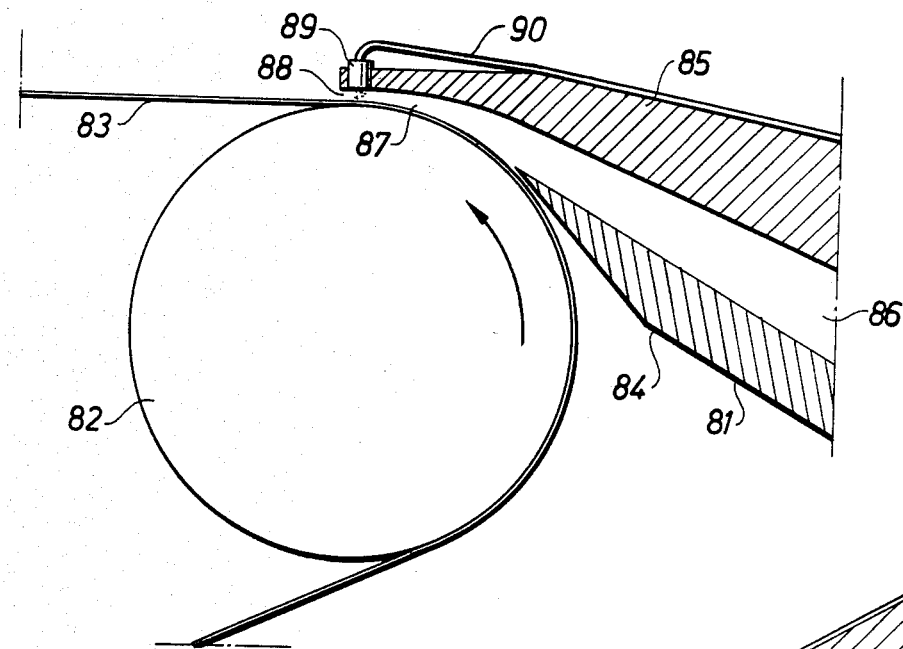
FIG. 9 is a schematic side view of portions of a forming zone in a breast roll former and shows portions of lip members of a headbox of a fifth design, which is provided with an apparatus according to a fifth embodiment of the invention.

FIG. 9 shows a further embodiment of the invention, in which a headbox 81 for producing a single-layer fiber web is designed and arranged to interact with a forming means in the form of a wire 83 and a breast roll 82 in a so-called breast roll former for forming the fiber web on the wire 83 running around the breast roll. The headbox includes lip members in the form of a lower lip 84 and a projecting upper lip 85, the latter being one of the two structural members between which measurements shall be taken in accordance with the present invention, in that the second structural member consists of the opposed wire 83. The lips demarcate between them a space 86 converging in the direction of flow and terminating in a slice opening 87. The projecting upper lip can be mounted and equipped in the same way as for the previously described embodiments for adjustment of a stock discharge slot 88, which is bounded by said two structural members, i.e. the projecting upper lip 85 and the opposed wire 83. An ultrasonic transducer means 89 is mounted in the projecting upper lip near one of its corners and is arranged to provide information about the distance to the wire according to the principle described previously. The ultrasonic transducer is arranged so near the edge of the opening that no correction for the geometry is necessary in this case. The ultrasonic transducer is connected by means of a coaxial cable 90 to an electronic measuring unit (not shown), which can also be supplied with signals from a reference ultrasonic transducer (not shown), as described previously. Laboratory-scale trials have proved that the natural frequency of the ultrasonic transducer should be comparatively low, e.g. about 1-2 MHz, in order to obtain a sufficiently strong return echo when a transmitted ultrasonic pulse strikes the wire in a surface area exactly opposite the ultrasonic transducer. It has also been shown that the diameter of the ultrasonic transducer is of importance in this respect. The larger this diameter is, the stronger the output signal will be, which means that a reflecting echo can be detected more easily. In order to obtain the best result in each case, an ultrasonic transducer of suitable size and frequency is chosen.

Figure 10:
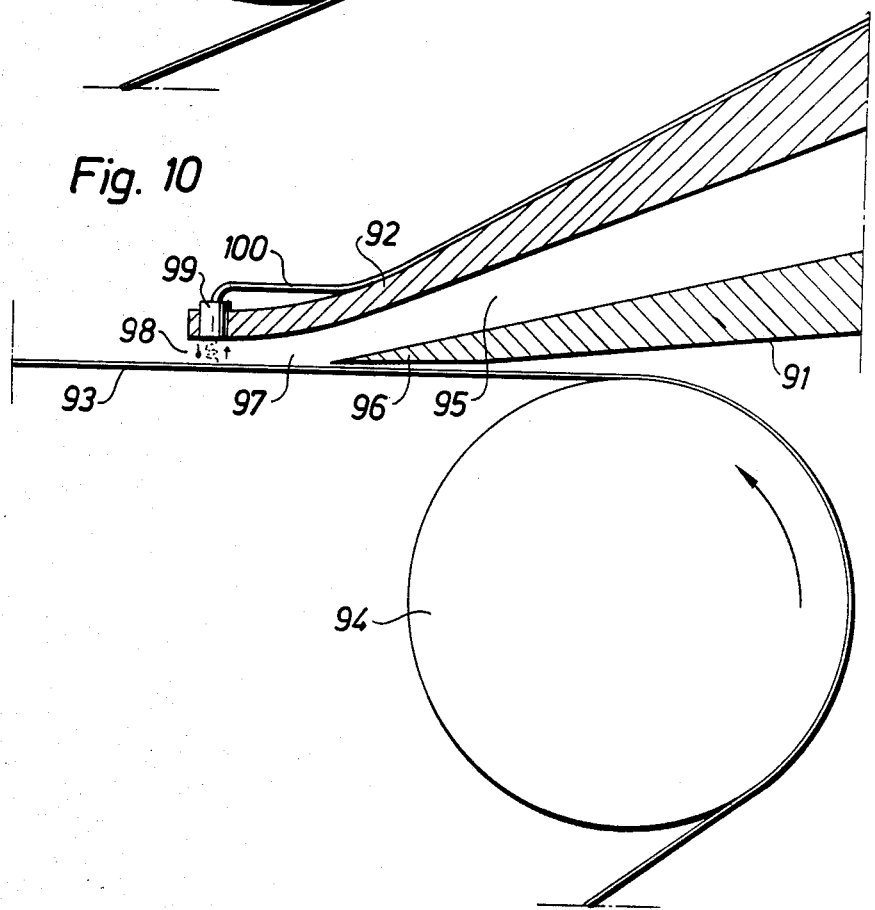
FIG. 10 is a schematic side view of a forming zone in a Fourdrinier former and shows portions of lip members of a headbox with an apparatus according to the invention similar to that in FIG. 9.

FIG. 10 shows an alternative embodiment of a headbox 91 with a lip member that comprises a projecting upper lip 92, in that the headbox is arranged to interact with a forming means in the form of a flat portion of a wire 93 in a Fourdrinier former after the wire has run around a roll 94 to form the fiber web on the flat portion of the wire. Stock flows through a space 95 converging in the direction of flow and bounded by the projecting upper lip and a lower lip 96, in that the space terminates in a slice opening 97, through which the stock flows out onto the flat portion of the wire. The projecting upper lip 92 is one of two structural members between which measurement shall take place according to the present invention, in that the second structural member is formed by the opposed wire. In the same way as for the embodiment according to FIG. 9, these two structural members form an adjustable stock discharge slot 98, the size of which is measured with the aid of an ultrasonic transducer means 99 arranged in the projecting upper lip and an electronic measuring unit (not shown) connected to this by a coaxial cable 100.

Naturally, it is within the scope of the invention that even in the embodiments shown in FIGS. 9 and 10 the headboxes can be multilayer headboxes, in which the distance measurements take place from the upper lip to the wire and from at least one partition to the wire.

The information about distances obtained at the measurements can be utilized in several ways in order to produce optimum operating conditions for papermaking. For example, for a single-layer headbox (FIG. 7) the distance reading (actual value) obtained can be compared with a setpoint in e.g. a PI controller, the output signal of which corresponds to a possible deviation of the actual value from the setpoint, this signal being used to operate the power means that is arranged to pivot the upper wall about its horizontal mounting axis and thereby set the upper lip 66 in relation to the lower lip 67 so that the slice opening 69 is that intended. The velocity of the stock jet when this leaves the headbox is adapted in a known way to the speed of the paper machine wire and/or other operating quantity, in that the stock pressure in the headbox can be used as a quantity for comparison with the speed of the paper machine wire. Instead of automatic control of the slice opening, the adjustment of the upper wall can be made manually after a deviation has been measured and established.

The measurement results obtained for a multilayer headbox can be used to control the stock supply to e.g. the two outer channels of a multilayer headbox with three channels. A control system of this type is disclosed in commonly-owned application Ser. No. 426,107 of Karl Johan Lennart Andersson entitled "Control System for Headboxes," filed concurrently herewith.

Figure 11:
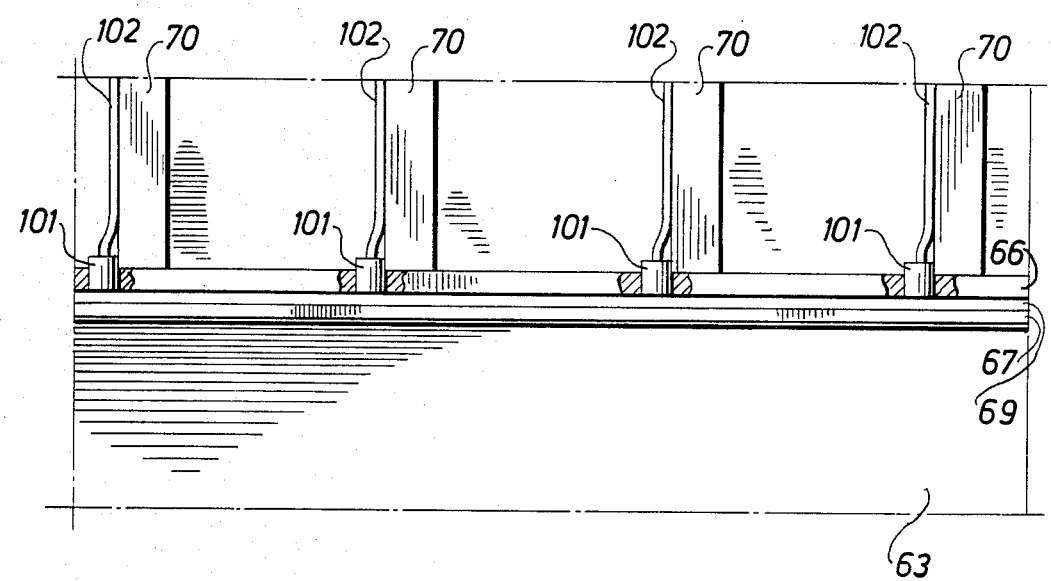
FIG. 11 is a schematic front view of a headbox substantially of the design shown in FIG. 7 and provided with an apparatus according to a further embodiment of the invention.

The invention can also be applied in connection with measurement and adjustment of the profile of the stock discharge slot or slice opening across the headbox by arranging a plurality of ultrasonic transducer means in one of the lips. FIG. 11 illustrates such a further alternative embodiment of the invention for a headbox of substantially the same design as that described in conjunction with FIG. 7, in that the same reference numerals in FIGS. 7 and 11 indicate similar parts and members. The headbox has a plurality of profile adjustment means 70 equally spaced in its cross direction for local adjustment of the profile of the slice opening 69. As shown in FIG. 11, a plurality of ultrasonic transducer means 101 are mounted in the upper lip 66 at measuring points, e.g. located at each profile adjustment means 70. The ultrasonic transducers are connected by means of coaxial cables 102 to an electronic measuring unit (not shown). The values of the distances recorded by the ultrasonic transducers, equally spaced in the cross direction according to the invention, with the aid of the electronic measuring unit can then be compared with the setpoints for slice opening profile for changing the slice opening profile at the points where this is required in order to obtain a desired dry weight profile and/or moisture profile of the paper web in its cross direction. A real advantage which the invention offers in the measurement of the slice opening profile is that the information obtained about distances represents measurement results that can be transferred to a computer, where every measurement result can indicate the actual distance between lip members or between the slice and the opposed lip member or the wire at the measuring point, i.e. due regard is taken to the position of the opposed lip member or wire in a particularly simple and reliable way. Previously, this has not been possible. The transferred measurement results (actual values) can be compared with measurement data (setpoints) concerning the dry weight profile and/or the moisture profile of the paper web and any recorded deviations can be converted into recommendations to adjust the slice opening profile at the point or points in question. The slice opening profile can be adjusted manually, but the invention also offers great possibilities of automation. A reference ultrasonic transducer can be arranged for this embodiment also, upstream of the headbox in order to compensate for altered sound velocities at different temperatures. According to still another embodiment (not shown), a plurality of ultrasonic transducer means can be arranged in a substantially similar way in a headbox that is provided with profile adjustment means in the form of a plurality of lip screws and a slice deformable by means of these and which forms the slice opening profile together with the lower lip or the wire (see for example GB No. 1,488,200).

In some cases it is suitable to arrange the ultrasonic transducer means let into the lip for some distance, in which case a space existing between transducer and lip surface is filled with one or more thin reflection-reducing layers (not shown), that have an acoustic impedance with a magnitude between the acoustic impedances of the crystal and the stock. If more than one layer is used, their acoustic impedances should be chosen in such a way that the layer nearest the transducer has an acoustic impedance that is between that of the next layer and that of the transducer, and so on. In this way the strength of the signal received by the ultrasonic transducer means will be increased.

That which is claimed is:

1. A method for directly measuring, during the operation of a paper machine, the distance between two structural members positioned in opposed spaced apart relation to one another and defining a stock discharge slot therebetween, said method comprising transmitting an ultrasonic pulse from one of the structural members through the stock passing between the cooperating structural members and to the oppositely positioned structural member, and measuring the travel time of the ultrasonic pulse across the slot, from which can be determined the distance between said structural members.

2. A method according to claim 1 including the further step of converting the measured travel time of the ultrasonic pulse into a distance.

3. A method according to claim 1 wherein said step of transmitting an ultrasonic pulse comprises transmitting said pulse from an ultrasonic transducer comprising a combined transmitter and receiver for ultrasound, and wherein said step of measuring the travel time of the ultrasonic pulse across the slot comprises receiving at said ultrasonic transducer the ultrasonic pulse reflected from the oppositely positioned structural member.

4. A method according to claim 1 wherein said step of transmitting an ultrasonic pulse comprises transmitting an ultrasonic pulse from a plurality of measuring points across the width of the structural member for thereby obtaining information about the profile of the discharge slot.

5. A method according to claim 1 including the further step of measuring the travel time of an ultrasonic pulse over a known distance through the stock at the temperature in question and adjusting the measured travel time of the ultrasonic pulse across the slot by said measured travel time over a known distance to thereby indicate actual distance values for the discharge slot taking into consideration the sound velocity value at the temperature of the slot.

6. A method according to claim 1 wherein said stock discharge slot comprises a multilayer headbox, and wherein at least one thin stock separating partition is arranged between said structural members, and wherein said step of transmitting an ultrasonic pulse comprises transmitting a pulse from said one structural member through a hole provided in said at least one partition.

7. Apparatus for directly measuring the distance across the stock discharge slot of a paper machine during the operation of the paper machine, said apparatus comprising stock-delivering means including a pair of cooperating structural members positioned in opposed spaced apart relation and defining a stock discharge slot therebetween, ultrasonic transducer means mounted in one of said structural members and arranged to transmit an ultrasonic pulse through the stock passing between said cooperating structural members and to the oppositely positioned structural member, and an electronic measuring unit connected to said ultrasonic transducer means and operable to measure the travel time of the ultrasonic pulse across the slot defined between said structural members, from which can be determined the distance between said structural members.

8. Apparatus according to claim 7 wherein stock-delivering means comprises a headbox and said pair of cooperating structural members comprise two lip members.

9. Apparatus according to claim 8 wherein said headbox is a multilayer headbox, and including at least one separating partition located between the two lip members.

10. Apparatus according to claim 8 wherein said transducer means comprises an ultrasonic transmitter located in one of the lips and an ultrasonic receiver located in the other one of the cooperating lips.

11. Apparatus according to claim 7 wherein said ultrasonic transducer means comprises a combined ultrasonic transmitter and receiver.

12. Apparatus according to claim 7 wherein one of said structural members comprises a lip member and the other structural member comprises a forming means for receiving the delivered stock for forming a paper web by dewatering the stock, and wherein said transducer means is located in said lip member.

13. Apparatus according to claim 12 wherein said forming means comprises a breast roll and a wire running over said breast roll, and wherein said lip is positioned above said wire to define a discharge slot therebetween, and wherein said ultrasonic transducer means is arranged in said lip for measuring the distance to the wire running beneath it.

14. Apparatus according to claim 7 additionally comprising a reference ultrasonic transducer means operatively connected to said measuring unit and being operable for indirect measurement of the sound velocity in the stock at different temperatures by measuring the travel time of the ultrasonic pulse for a specified distance in stock at the temperature in question, so that the measuring unit can be adjusted to indicate actual distance values for the discharge slot taking into account the sound velocity value at the working temperature of the slot.

15. Apparatus according to claim 14 wherein said reference ultrasonic transducer means is located in a feed pipeline for supplying stock to the stock-delivering means.

16. Apparatus according to claim 7 wherein said ultrasonic transducer means comprises a combined transmitter and receiver for ultrasound in the form of a piezo-electric crystal, and wherein said electronic measuring unit includes means to induce said crystal to emit an ultrasonic pulse and means to convert to a distance value the travel time of the ultrasonic pulse from the crystal through the stock to an opposed surface and back to the crystal.

17. Apparatus according to claim 7 including a plurality of ultrasonic transducer means arranged in one of said structural members at spaced locations across the width of the structural member for measuring the distance to the other, opposed structural member at a plurality of measuring points for obtaining information about the profile of the discharge slot.

18. Apparatus for directly measuring the distance across the stock discharge slot of a paper machine during the operation of the paper machine, said apparatus comprising a headbox including cooperating upper and lower lip members positioned in opposed relation to one another and defining a stock discharge slot therebetween, ultrasonic transducer means mounted in one of said lip members and arranged to transmit an ultrasonic pulse through the stock passing between said cooperating lip members and to the oppositely positioned lip member, and an electronic measuring unit connected to said ultrasonic transducer means and operable to measure the travel time of the ultrasonic pulse across the slot defined between the two lip members, from which can be determined the distance between said two lip members.

19. Apparatus according to claim 18 wherein said headbox is a headbox for producing a single-layer web, and wherein one of the lip members is longer than the other and the lip members define a discharge slot in the form of a slice opening, and wherein said ultrasonic transducer means is arranged in the longer lip member.

20. A method for directly measuring, during the operation of a paper machine, the distance between a pair of cooperating lip members positioned in opposed spaced apart relation to one another and defining a stock discharge slot therebetween, said method comprising transmitting an ultrasonic pulse from one of the lip members through the stock passing between the cooperating lip members and to the oppositely positioned lip member, measuring the travel time of the ultrasonic pulse through the stock to said oppositely positioned lip member, and converting the measured travel time of ultrasonic pulse into the distance between the two lip members.

21. Apparatus for directly measuring the distance across the stock discharge slot of a paper machine during the operation of the paper machine, said apparatus comprising a multilayer headbox including cooperating upper and lower lip members positioned in opposed relation to one another and defining a stock discharge slot therebetween, and including two channel-portion-forming partitions arranged between said upper and lower lip members and defining three smaller discharge slots between said upper and lower lip members, two ultrasonic transducer means arranged in one of said partitions and oriented for measuring to one of said lips and to the other partition, respectively, and including an ultrasonic transducer means in said second partition arranged for measuring to said other lip.

22. Apparatus for directly measuring the distance across the stock discharge slot of a paper machine during the operation of the paper machine, said apparatus comprising a multilayer headbox including cooperating upper and lower lip members positioned in opposed relation to one another and defining a stock discharge slot therebetween, and including at least one stock-separating partition member located between said lip members, said at least one partition member being too thin to permit mounting of ultrasonic transducer means therein, and including two ultrasonic transducer means mounted in the other lip, the thin partition located nearer said one lip being provided with a through hole arranged exactly opposite one of said two ultrasonic transducer means to permit passage through this hole of a transmitted ultrasonic pulse.

* * * * *